United States Patent
Fripp et al.

(10) Patent No.: US 10,227,841 B2
(45) Date of Patent: Mar. 12, 2019

(54) DEGRADABLE WELLBORE ISOLATION DEVICES WITH DEGRADABLE SEALING BALLS

(71) Applicant: Halliburton Energy Services, Inc., Houston, TX (US)

(72) Inventors: Michael Linley Fripp, Carrollton, TX (US); Zachary William Walton, Carrollton, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 543 days.

(21) Appl. No.: 14/784,829

(22) PCT Filed: Jun. 30, 2015

(86) PCT No.: PCT/US2015/038624
§ 371 (c)(1),
(2) Date: Oct. 15, 2015

(87) PCT Pub. No.: WO2016/032621
PCT Pub. Date: Mar. 3, 2016

(65) Prior Publication Data
US 2016/0298412 A1    Oct. 13, 2016

Related U.S. Application Data

(63) Continuation of application No. PCT/US2014/053212, filed on Aug. 28, 2014.

(51) Int. Cl.
*E21B 33/129* (2006.01)
*E21B 33/12* (2006.01)
(Continued)

(52) U.S. Cl.
CPC .......... *E21B 33/1293* (2013.01); *C09K 8/426* (2013.01); *C09K 8/428* (2013.01);
(Continued)

(58) Field of Classification Search
CPC .. E21B 33/12; E21B 33/1293; E21B 33/1294; E21B 33/13; E21B 33/134; E21B 43/26
See application file for complete search history.

(56) References Cited

U.S. PATENT DOCUMENTS

| 4,655,852 A | 4/1987 | Rallis |
| 5,984,007 A | 11/1999 | Yuan et al. |

(Continued)

FOREIGN PATENT DOCUMENTS

| CA | 2886988 C | 8/2017 |
| WO | 2005090742 A1 | 9/2005 |

(Continued)

OTHER PUBLICATIONS

International Search Report and Written Opinion for PCT/US2015/038624 dated Sep. 18, 2015.

(Continued)

*Primary Examiner* — Caroline N Butcher
(74) *Attorney, Agent, or Firm* — McGuireWoods LLP (57) ABSTRACT

Downhole tools including a wellbore isolation device that provides a plurality of components including a mandrel, a packer element, and a sealing ball, wherein the mandrel defines a central flow passage that allows fluid flow in at least one direction through the wellbore isolation device, wherein at least a portion of the mandrel is composed of a degradable metal material, at least a portion of the packer element is composed of an elastomer, and at least a portion of the sealing ball is composed of a degradable substance, and wherein the degradable metal material and the degradable substance degrades upon exposure to a wellbore environment.

32 Claims, 2 Drawing Sheets

(51) Int. Cl.
  *C22C 23/02* (2006.01)
  *C22C 23/04* (2006.01)
  *E21B 33/13* (2006.01)
  *E21B 43/26* (2006.01)
  *C09K 8/42* (2006.01)
  *C22C 21/00* (2006.01)
  *E21B 33/134* (2006.01)

(52) U.S. Cl.
  CPC .............. *C22C 21/00* (2013.01); *C22C 23/02* (2013.01); *C22C 23/04* (2013.01); *E21B 33/12* (2013.01); *E21B 33/1294* (2013.01); *E21B 33/13* (2013.01); *E21B 33/134* (2013.01); *E21B 43/26* (2013.01)

(56) References Cited

U.S. PATENT DOCUMENTS

| | | | |
|---|---|---|---|
| 7,168,494 | B2 | 1/2007 | Starr et al. |
| 7,350,582 | B2 | 4/2008 | McKeachnie et al. |
| 7,353,879 | B2 | 4/2008 | Todd et al. |
| 7,690,436 | B2 | 4/2010 | Turley et al. |
| 8,211,248 | B2 | 7/2012 | Marya |
| 8,267,177 | B1 | 9/2012 | Vogel et al. |
| 8,413,727 | B2 | 4/2013 | Holmes |
| 8,573,295 | B2 | 11/2013 | Johnson et al. |
| 8,695,714 | B2 | 4/2014 | Xu et al. |
| 8,746,342 | B1 | 6/2014 | Nish et al. |
| 8,905,147 | B2 | 12/2014 | Fripp et al. |
| 9,016,363 | B2 | 4/2015 | Xu et al. |
| 9,217,319 | B2 | 12/2015 | Frazier et al. |
| 9,309,744 | B2 | 4/2016 | Frazier |
| 2006/0131031 | A1 | 6/2006 | McKeachnie et al. |
| 2006/0278405 | A1 | 12/2006 | Turley et al. |
| 2007/0074873 | A1 | 4/2007 | McKeachnie et al. |
| 2008/0149345 | A1 | 6/2008 | Marya et al. |
| 2010/0270031 | A1 | 10/2010 | Patel |
| 2011/0048743 | A1 | 3/2011 | Stafford et al. |
| 2011/0067889 | A1 | 3/2011 | Marya et al. |
| 2011/0132621 | A1 | 6/2011 | Agrawal et al. |
| 2012/0097384 | A1 | 4/2012 | Valencia et al. |
| 2012/0125642 | A1 | 5/2012 | Chenault et al. |
| 2012/0292053 | A1 | 11/2012 | Xu et al. |
| 2012/0318513 | A1 | 12/2012 | Mazyar et al. |
| 2013/0048305 | A1 | 2/2013 | Xu et al. |
| 2013/0112429 | A1 | 5/2013 | Crews |
| 2013/0327540 | A1 | 12/2013 | Hamid et al. |
| 2014/0027128 | A1 | 1/2014 | Johnson et al. |
| 2014/0190685 | A1 | 7/2014 | Frazier et al. |
| 2014/0190705 | A1 | 7/2014 | Fripp et al. |
| 2014/0224477 | A1 | 8/2014 | Wiese et al. |
| 2014/0305627 | A1 | 10/2014 | Manke |
| 2015/0354311 | A1 | 12/2015 | Okura et al. |
| 2016/0201427 | A1 | 7/2016 | Fripp et al. |
| 2016/0230498 | A1 | 8/2016 | Walton et al. |
| 2016/0251934 | A1 | 9/2016 | Walton et al. |

FOREIGN PATENT DOCUMENTS

| | | |
|---|---|---|
| WO | WO-2013109287 A1 | 7/2013 |
| WO | 2014100141 A2 | 6/2014 |
| WO | WO-2015171126 A1 | 11/2015 |
| WO | 2016032493 A1 | 3/2016 |
| WO | 2016032620 A1 | 3/2016 |
| WO | 2016032621 A1 | 3/2016 |
| WO | 2016032761 A1 | 3/2016 |

OTHER PUBLICATIONS

Ginger Gardiner, "Composites boon from hyrdaulic fracturing?" CompositesWorld, Jan. 8, 2014, XP055267997, obtained from http://www.compositesworld.com/blog/post/composites-boon-from-hydraulic-fracturing.

Search Report received in corresponding Netherlands Application No. 1041449, dated May 17, 2016.

Canadian Office Action from Canadian Patent Application No. 2,955,922; dated Dec. 8, 2017, 3 pages.

Australian Examination Report from Australian Patent Application No. 2015307211, dated Feb. 5, 2018, 5 pages.

DEGRADABLE WELLBORE ISOLATION DEVICES WITH DEGRADABLE SEALING BALLS

CROSS-REFERENCE TO RELATED APPLICATIONS

This application claims priority to PCT/US2014/053212 filed on Aug. 28, 2014 and entitled "Degradable Wellbore Isolation Devices with Large Flow Areas."

BACKGROUND

The present disclosure generally relates to downhole tools used in the oil and gas industry and, more particularly, to wellbore isolation devices having particular degradable components.

In the drilling, completion, and stimulation of hydrocarbon-producing wells, a variety of downhole tools are used. For example, it is often desirable to seal portions of a wellbore, such as during fracturing operations when various fluids and slurries are pumped from the surface into a casing string that lines the wellbore, and forced out into a surrounding subterranean formation through the casing string. It thus becomes necessary to seal the wellbore and thereby provide zonal isolation at the location of the desired subterranean formation. Wellbore isolation devices, such as packers, bridge plugs, and fracturing plugs (i.e., "frac" plugs), are designed for these general purposes and are well known in the art of producing hydrocarbons, such as oil and gas. Such wellbore isolation devices may be used in direct contact with the formation face of the wellbore, with a casing string extended and secured within the wellbore, or with a screen or wire mesh.

After the desired downhole operation is complete, the seal formed by the wellbore isolation device must be broken and the tool itself removed from the wellbore. Removing the wellbore isolation device may allow hydrocarbon production operations to commence without being hindered by the presence of the downhole tool. Removing wellbore isolation devices, however, is traditionally accomplished by a complex retrieval operation that involves milling or drilling out a portion of the wellbore isolation device, and subsequently mechanically retrieving its remaining portions. To accomplish this, a tool string having a mill or drill bit attached to its distal end is introduced into the wellbore and conveyed to the wellbore isolation device to mill or drill out the wellbore isolation device. After drilling out the wellbore isolation device, the remaining portions of the wellbore isolation device may be grasped onto and retrieved back to the surface with the tool string for disposal. As can be appreciated, this retrieval operation can be a costly and time-consuming process.

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, without departing from the scope of this disclosure.

DETAILED DESCRIPTION

The present disclosure generally relates to downhole tools used in the oil and gas industry and, more particularly, to wellbore isolation devices having particular degradable components.

The present disclosure describes embodiments of wellbore isolation devices that are made of slowly degrading materials. In particular, the present disclosure describes wellbore isolation devices having a variety of components including a mandrel, a sealing ball, and an expandable or inflatable packer element, wherein the mandrel is composed of a slowly degradable metal material (also referred to simply as "degradable metal material") and the sealing ball is composed of a degradable material, both of which degrade in a wellbore environment. The packer element is composed of an elastomer, which may preferably be a degradable elastomer that is degradable in the wellbore environment. These degradable materials (also referred to collectively as "degradable substances") are discussed in greater detail below. As used herein, the term "wellbore isolation device," and grammatical variants thereof, is a device that is set in a wellbore to isolate a portion of the wellbore thereabove from a portion therebelow so that fluid can be forced into the surrounding subterranean formation above the device. As used herein, the term "sealing ball," and grammatical variants thereof, refers to a spherical or spheroidal element designed to seal perforations of a wellbore isolation device that are accepting fluid, thereby diverting reservoir treatments to other portions of a target zone. An example of a sealing ball is a frac ball in a frac plug wellbore isolation device. As used herein, the term "packer element" refers to an expandable, inflatable, or swellable element that expands against a casing or wellbore to seal the wellbore.

One or more illustrative embodiments disclosed herein are presented below. Not all features of an actual implementation are described or shown in this application for the sake of clarity. It is understood that in the development of an actual embodiment incorporating the embodiments disclosed herein, numerous implementation-specific decisions must be made to achieve the developer's goals, such as compliance with system-related, lithology-related, business-related, government-related, and other constraints, which vary by implementation and from time to time. While a developer's efforts might be complex and time-consuming, such efforts would be, nevertheless, a routine undertaking for those of ordinary skill in the art having benefit of this disclosure.

It should be noted that when "about" is provided herein at the beginning of a numerical list, the term modifies each number of the numerical list. In some numerical listings of ranges, some lower limits listed may be greater than some upper limits listed. One skilled in the art will recognize that the selected subset will require the selection of an upper limit in excess of the selected lower limit. Unless otherwise indicated, all numbers expressed in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the exemplary embodiments described herein. At the very least, and not as an attempt to limit the application of the doctrine of equivalents to the scope of the claim, each numerical parameter should at least be construed in light of the number of reported significant digits and by applying ordinary rounding techniques.

While compositions and methods are described herein in terms of "comprising" various components or steps, the compositions and methods can also "consist essentially of" or "consist of" the various components and steps. When "comprising" is used in a claim, it is open-ended.

The use of directional terms such as above, below, upper, lower, upward, downward, left, right, uphole, downhole and the like are used in relation to the illustrative embodiments as they are depicted in the figures, the upward direction being toward the top of the corresponding figure and the downward direction being toward the bottom of the corresponding figure, the uphole direction being toward the surface of the well and the downhole direction being toward the toe of the well.

The embodiments of the present disclosure are directed toward degradable wellbore isolation devices (e.g., frac plugs) comprising at least a degradable metal mandrel and a degradable sealing plug (e.g., frac plug). As used herein, the term "degradable" and all of its grammatical variants (e.g., "degrade," "degradation," "degrading," "dissolve," "dissolving," and the like), refers to the dissolution or chemical conversion of solid materials such that reduced-mass solid end products by at least one of solubilization, hydrolytic degradation, biologically formed entities (e.g., bacteria or enzymes), chemical reactions (including electrochemical and galvanic reactions), thermal reactions, reactions induced by radiation, or combinations thereof. In complete degradation, no solid end products result. In some instances, the degradation of the material may be sufficient for the mechanical properties of the material to be reduced to a point that the material no longer maintains its integrity and, in essence, falls apart or sloughs off into its surroundings. The conditions for degradation are generally wellbore conditions where an external stimulus may be used to initiate or effect the rate of degradation, where the external stimulus is naturally occurring in the wellbore (e.g., pressure, temperature) or introduced into the wellbore (e.g., fluids, chemicals). For example, the pH of the fluid that interacts with the material may be changed by introduction of an acid or a base. The term "wellbore environment" includes both naturally occurring wellbore environments and materials or fluids introduced into the wellbore. The term "at least a portion" with reference to degradation (e.g., "at least a portion of the mandrel is degradable" or "at least a portion of the degradable packer element is degradable," and variants thereof) refers to degradation of at least about 80% of the volume of that part.

The degradable metal materials for forming at least the mandrel (and any other components of a wellbore isolation device, including the sealing ball) are slowly degradable, and typically less expensive than rapidly degrading materials. Thus, the wellbore isolation devices described herein may be less expensive as compared to downhole tools made of rapidly dissolving or degrading materials. The slowly degradable metal materials may allow for more time between setting a wellbore isolation device and when a particular downhole operation is undertaken, such as a hydraulic fracturing treatment operation. Moreover, slowly degradable metal materials allow for acid treatments and acidified stimulation of a wellbore. In some embodiments, the slowly degradable metal materials may require a greater flow area or flow capacity to enable production operations without unreasonably impeding or obstructing fluid flow while the wellbore isolation device degrades. As a result, production operations may be efficiently undertaken while the wellbore isolation device degrades and without creating significant pressure restrictions.

Figure 1:
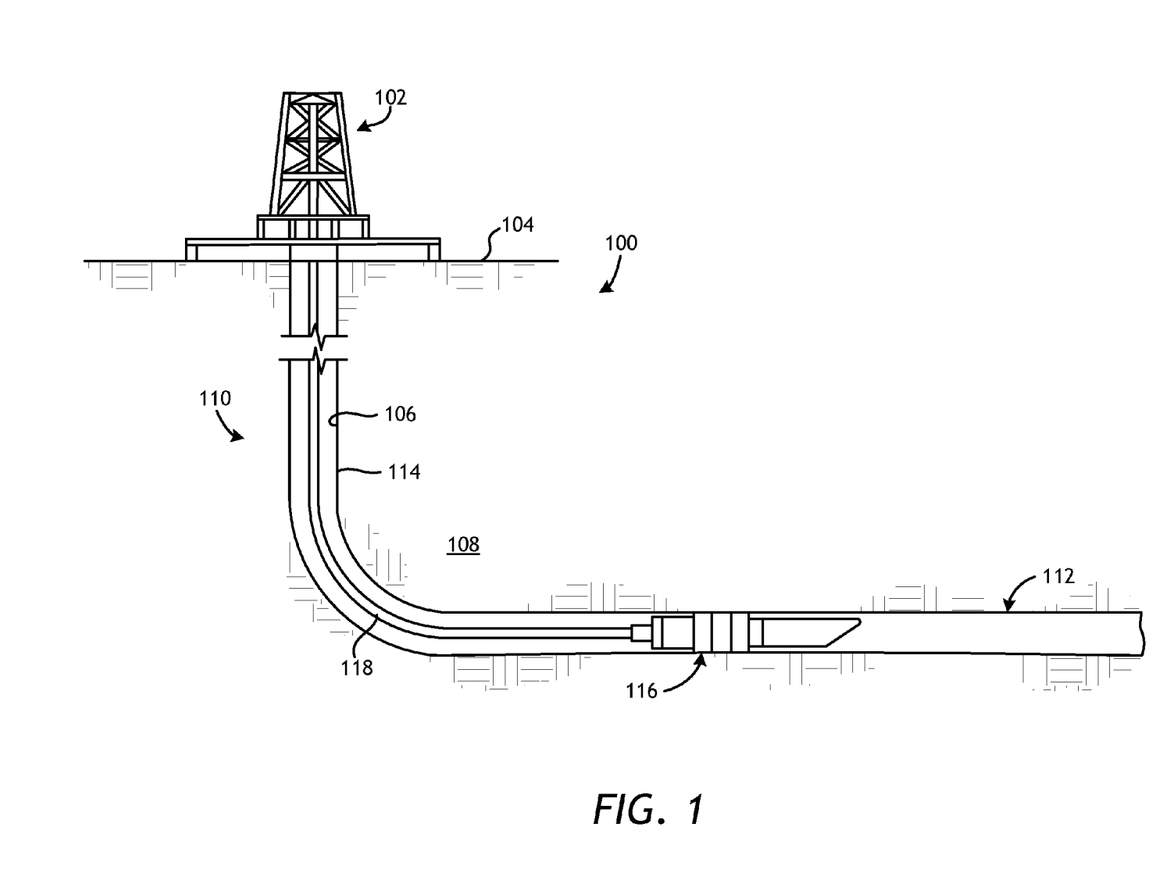
FIG. 1 is a well system that can employ one or more principles of the present disclosure, according to one or more embodiments.

Referring to FIG. 1, illustrated is a well system 100 that may embody or otherwise employ one or more principles of the present disclosure, according to one or more embodiments. As illustrated, the well system 100 may include a service rig 102 (also referred to as a "derrick") that is positioned on the earth's surface 104 and extends over and around a wellbore 106 that penetrates a subterranean formation 108. The service rig 102 may be a drilling rig, a completion rig, a workover rig, or the like. In some embodiments, the service rig 102 may be omitted and replaced with a standard surface wellhead completion or installation, without departing from the scope of the disclosure. While the well system 100 is depicted as a land-based operation, it will be appreciated that the principles of the present disclosure could equally be applied in any sea-based or sub-sea application where the service rig 102 may be a floating platform or sub-surface wellhead installation, as generally known in the art.

The wellbore 106 may be drilled into the subterranean formation 108 using any suitable drilling technique and may extend in a substantially vertical direction away from the earth's surface 104 over a vertical wellbore portion 110. At some point in the wellbore 106, the vertical wellbore portion 110 may deviate from vertical relative to the earth's surface 104 and transition into a substantially horizontal wellbore portion 112, although such deviation is not required. That is, the wellbore 106 may be vertical, horizontal, or deviated, without departing from the scope of the present disclosure. In some embodiments, the wellbore 106 may be completed by cementing a string of casing 114 within the wellbore 106 along all or a portion thereof. As used herein, the term "casing" refers not only to casing as generally known in the art, but also to borehole liner, which comprises tubular sections coupled end to end but not extending to a surface location. In other embodiments, however, the string of casing 114 may be omitted from all or a portion of the wellbore 106 and the principles of the present disclosure may equally apply to an "open-hole" environment.

The well system 100 may further include a wellbore isolation device 116 that may be conveyed into the wellbore 106 on a conveyance 118 (also referred to as a "tool string") that extends from the service rig 102. The wellbore isolation device 116 may include or otherwise comprise any type of casing or borehole isolation device known to those skilled in the art including, but not limited to, a frac plug, a deployable baffle, a wellbore packer, a wiper plug, a cement plug, or any combination thereof. The conveyance 118 that delivers the wellbore isolation device 116 downhole may be, but is not limited to, wireline, slickline, an electric line, coiled tubing, drill pipe, production tubing, or the like.

The wellbore isolation device 116 may be conveyed downhole to a target location (not shown) within the wellbore 106. At the target location, the wellbore isolation device may be actuated or "set" to seal the wellbore 106 and otherwise provide a point of fluid isolation within the wellbore 106. In some embodiments, the wellbore isolation device 116 is pumped to the target location using hydraulic pressure applied from the service rig 102 at the surface 104. In such embodiments, the conveyance 118 serves to maintain control of the wellbore isolation device 116 as it traverses the wellbore 106 and provides the necessary power to actuate and set the wellbore isolation device 116 upon reaching the target location. In other embodiments, the wellbore isolation device 116 freely falls to the target location under the force of gravity to traverse all or part of the wellbore 106.

It will be appreciated by those skilled in the art that even though FIG. 1 depicts the wellbore isolation device 116 as being arranged and operating in the horizontal portion 112 of the wellbore 106, the embodiments described herein are equally applicable for use in portions of the wellbore 106 that are vertical, deviated, or otherwise slanted. It should also be noted that a plurality of wellbore isolation devices 116 may be placed in the wellbore 106. In some embodiments, for example, several (e.g., six or more) wellbore isolation devices 116 may be arranged in the wellbore 106 to divide the wellbore 106 into smaller intervals or "zones" for hydraulic stimulation.

Figure 2:
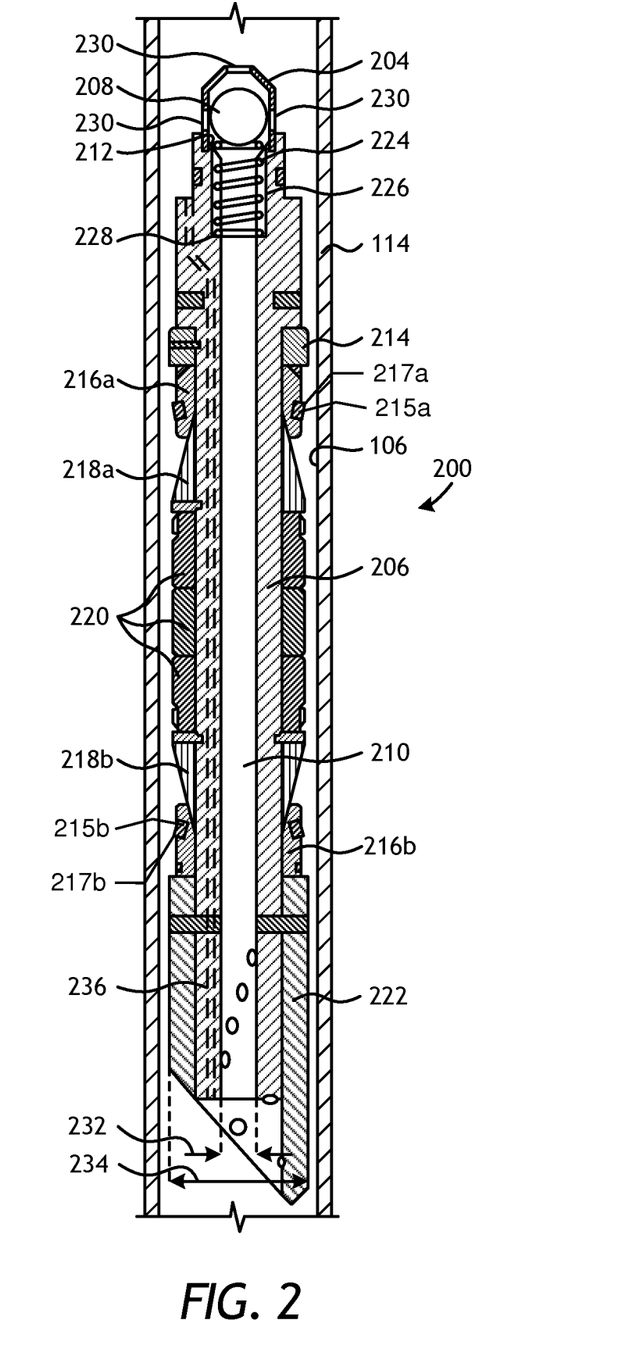
FIG. 2 is a cross-sectional side view of an exemplary frac plug that can employ the principles of the present disclosure.

Referring now to FIG. 2, with continued reference to FIG. 1, illustrated is a cross-sectional view of an exemplary wellbore isolation device 200 that may employ one or more of the principles of the present disclosure, according to one or more embodiments. The wellbore isolation device 200 may be similar to or the same as the wellbore isolation device 116 of FIG. 1. Accordingly, the wellbore isolation device 200 may be configured to be extended into and seal the wellbore 106 at a target location, and thereby prevent fluid flow past the wellbore isolation device 200 for wellbore completion or stimulation operations. In some embodiments, as illustrated, the wellbore 106 may be lined with the casing 114 or another type of wellbore liner or tubing in which the wellbore isolation device 200 may suitably be set. In other embodiments, however, the casing 114 may be omitted and the wellbore isolation device 200 may instead be set or otherwise deployed in an uncompleted or "openhole" environment.

The wellbore isolation device 200 is generally depicted and described herein as a hydraulic fracturing plug or "frac" plug. It will be appreciated by those skilled in the art, however, that the principles of this disclosure may equally apply to any of the other aforementioned types of casing or borehole isolation devices, without departing from the scope of the disclosure. Indeed, the wellbore isolation device 200 may be any of a frac plug, a bridge plug, a wellbore packer, a deployable baffle, a cement plug, a wiper plug, or any combination thereof in keeping with the principles of the present disclosure. Where a flow passage is provided in the wellbore isolation device 200, as discussed in detail below, the wellbore isolation device 200 may be any of a frac plug, a wellbore packer, a deployable packer, or any combination thereof.

As illustrated, the wellbore isolation device 200 may include a ball cage 204 extending from or otherwise coupled to the upper end of a mandrel 206. A sealing ball 208 (e.g., a frac ball) is disposed in the ball cage 204 and the mandrel 206 defines a longitudinal central flow passage 210. The mandrel 206 also defines a ball seat 212 at its upper end. One or more spacer rings 214 (one shown) may be secured to the mandrel 206 and otherwise extend thereabout. The spacer ring 214 provides an abutment, which axially retains a set of upper slips 216a that are also positioned circumferentially about the mandrel 206. As illustrated, a set of lower slips 216b may be arranged distally from the upper slips 216a. In other embodiments, the sealing ball 208 may be dropped into the conveyance 118 (FIG. 1) to land on top of the wellbore isolation device 200 rather than being carried within the ball cage 204.

One or more slip wedges 218 (shown as upper and lower slip wedges 218a and 218b, respectively) may also be positioned circumferentially about the mandrel 206, and a packer assembly consisting of one or more expandable or inflatable packer elements 220 may be disposed between the upper and lower slip wedges 218a,b and otherwise arranged about the mandrel 206. It will be appreciated that the particular packer assembly depicted in FIG. 2 is merely representative as there are several packer arrangements known and used within the art. For instance, while three packer elements 220 are shown in FIG. 2, the principles of the present disclosure are equally applicable to wellbore isolation devices that employ more or less than three packer elements 220, without departing from the scope of the disclosure.

A mule shoe 222 may be positioned at or otherwise secured to the mandrel 206 at its lower or distal end. As will be appreciated, the lower most portion of the wellbore isolation device 200 need not be a mule shoe 222, but could be any type of section that serves to terminate the structure of the wellbore isolation device 200, or otherwise serves as a connector for connecting the wellbore isolation device 200 to other tools, such as a valve, tubing, or other downhole equipment.

In some embodiments, a spring 224 may be arranged within a chamber 226 defined in the mandrel 206 and otherwise positioned coaxial with and fluidly coupled to the central flow passage 210. At one end, the spring 224 biases a shoulder 228 defined by the chamber 226 and at its opposing end the spring 224 engages and otherwise supports the sealing ball 208. The ball cage 204 may define a plurality of ports 230 (three shown) that allow the flow of fluids therethrough, thereby allowing fluids to flow through the length of the wellbore isolation device 200 via the central flow passage 210.

As the wellbore isolation device 200 is lowered into the wellbore 106, the spring 224 prevents the sealing ball 208 from engaging the ball seat 212. As a result, fluids may pass through the wellbore isolation device 200; i.e., through the ports 230 and the central flow passage 210. The ball cage 204 retains the sealing ball 208 such that it is not lost during translation into the wellbore 106 to its target location. Once the wellbore isolation device 200 reaches the target location, a setting tool (not shown) of a type known in the art can be used to move the wellbore isolation device 200 from its unset position (shown in FIG. 2) to a set position. The setting tool may operate via various mechanisms to anchor the wellbore isolation device 200 in the wellbore 106 including, but not limited to, hydraulic setting, mechanical setting, setting by swelling, setting by inflation, and the like. In the set position, the slips 216a,b and the packer elements 220 expand and engage the inner walls of the casing 114.

When it is desired to seal the wellbore 106 at the target location with the wellbore isolation device 200, fluid is injected into the wellbore 106 and conveyed to the wellbore isolation device 200 at a predetermined flow rate that overcomes the spring force of the spring 224 and forces the sealing ball 208 downwardly until it sealingly engages the ball seat 212. When the sealing ball 208 is engaged with the ball seat 212 and the packer elements 220 are in their set position, fluid flow past or through the wellbore isolation device 200 in the downhole direction is effectively prevented. At that point, completion or stimulation operations may be undertaken by injecting a treatment or completion fluid into the wellbore 106 and forcing the treatment/completion fluid out of the wellbore 106 and into a subterranean formation above the wellbore isolation device 200.

Following completion and/or stimulation operations, the wellbore isolation device 200 must be removed from the wellbore 106 in order to allow production operations to effectively occur without being excessively hindered by the emplacement of the wellbore isolation device 200. According to the present disclosure, various components of the wellbore isolation device 200 may be made of one or more slowly degrading or dissolving materials. The slowly degrading materials provide more time between setting the wellbore isolation device 200 and when a desired completion or stimulation operation is undertaken, such as a hydraulic fracturing operation. Moreover, slowly degrading materials allow for acid treatments and acidified stimulation of the wellbore 106. As will be appreciated, slowly degrading materials are typically less expensive than rapidly degrading metals and, therefore, the wellbore isolation device 200 may be less expensive as compared to wellbore isolation devices made of rapidly dissolving or degrading materials.

As at least the mandrel 206 (and, in some embodiments, at least the sealing ball 208, or any other component) are made of slowly degradable metal materials, it may be desirable that the wellbore isolation device 200 have a greater flow area or flow capacity through and/or around the wellbore isolation device 200. According to the present disclosure, in some embodiments the wellbore isolation device 200 may exhibit a large flow area or flow capacity through and/or around the wellbore isolation device 200 so that it does not unreasonably impede, obstruct, or inhibit production operations while the wellbore isolation device 200 degrades. As a result, production operations may be undertaken while the wellbore isolation device 200 proceeds to dissolve and/or degrade, and without creating a significant pressure restriction within the wellbore 106.

The wellbore isolation device 200 may provide a minimum production flow area across the wellbore isolation device 200. As used herein "production flow area across" the wellbore isolation device 200 refers to any fluid flow through and/or around the wellbore isolation device 200. In some embodiments, the minimum production flow area across the wellbore isolation device 200 may be a desired fraction of the total flow area of the wellbore 106 (i.e., the casing 114) at the location of the wellbore isolation device 200. More particularly, in at least one embodiment, the wellbore isolation device 200 may exhibit a production flow area across the wellbore isolation device 200 that is at least 1/25 the total flow area of the wellbore 106 (i.e., the casing 114) at the location of the wellbore isolation device 200. In another embodiment, the wellbore isolation device 200 may exhibit a production flow area across the wellbore isolation device 200 that is at least 1/16 of the total flow area of the wellbore 106 at the location of the wellbore isolation device 200. The production flow area across the wellbore isolation device 200 may include any fluid flow through the central flow passage 210 and any other flow paths through or around the wellbore isolation device 200 that are not necessarily through the central flow passage 210. In some embodiments, for instance, the wellbore isolation device 200 may further include one or more conduits or flow channels 236 defined longitudinally through the mandrel 206 or other structural portions of the wellbore isolation device 200 through which fluids may flow during production operations.

In other embodiments, the minimum production flow area of the wellbore isolation device 200 may correspond to a desired ratio between the inner and outer diameters of the wellbore isolation device 200. The term "diameter" with reference to the minimum production flow area refers to the diameter of the cross-sectional area of the wellbore isolation device 200 or the hydraulic diameter of a flow path (or a combined flow area) through the wellbore isolation device 200. The hydraulic diameter is defined as four times the cross-sectional area divided by the wetted perimeter of the cross section. As illustrated, the wellbore isolation device 200 may exhibit an inner diameter 232 and an outer diameter 234. The inner diameter 232 may generally comprise the diameter of the central flow passage 210, and the outer diameter 234 may comprise the diameter of the wellbore isolation device 200 in the run-in or unexpanded configuration. In at least one embodiment, the inner diameter 232 of the wellbore isolation device 200 may be at least 17% (i.e., 1/6) of the outer diameter 234 of the wellbore isolation device 200. In another embodiment, the inner diameter 232 of the wellbore isolation device 200 may be at least 25% (i.e., 1/4) of the outer diameter 234 of the wellbore isolation device 200. The minimum 17% threshold may be calculated from the pressure drop across the wellbore isolation device 200 as a function of the flow rate through the central flow passage 210 in applications having multiple wellbore isolation devices positioned within the wellbore 106. Having the inner diameter 232 greater than 17% of the outer diameter 234 may increase the production flow area through the central flow passage 210 and thereby provide a lower pressure drop across the wellbore isolation device 200. The upper limit of the inner diameter 232 may be dependent on the structural limitations of the wellbore isolation device 200 and, more particularly, the structural limitations of the mandrel 206. For instance, the inner diameter 232 may be any diameter as long as the mandrel 206 remains able to adequately hold or maintain pressure loads that may be assumed during downhole operation.

In yet other embodiments, the minimum production flow area of the wellbore isolation device 200 may need to be larger than the aforementioned two options. With a larger number of wellbore isolation devices, with higher production flow rates, or with lower acceptable pressure drop, the minimum production flow area should be larger to achieve a lower pressure drop of the fluid across the wellbore isolation device 200. In these cases, the fraction of the total flow area should be larger, or the inner diameter 232 of the wellbore isolation device 200 should be a higher fraction of the outer diameter 234. For example, in at least one embodiment, a large number of wellbore isolation devices (e.g., greater than twenty-nine) may be required. In such embodiments, the minimum production flow area of the wellbore isolation device 200 may be achieved by having a production flow area through and/or around the wellbore isolation device 200 that is at least 1/9 of the total flow area of the wellbore 106 (i.e., the casing 114) at the location of the wellbore isolation device 200, or where the inner diameter 232 of the wellbore isolation device 200 is at least 33% (i.e., 1/3) of the outer diameter 234. In another embodiment, an even larger number of wellbore isolation devices (e.g., greater than forty-nine) may be required for a specific application. In such embodiments, the minimum production flow area of the wellbore isolation device 200 may be achieved by having a production flow area through and/or around the wellbore isolation device 200 that is at least 1/6 of the total flow area of the wellbore 106 at the location of the wellbore isolation device 200, or where the inner diameter 232 of the wellbore isolation device 200 is at least 41% of the outer diameter 234.

According to the present disclosure, at least the mandrel 206 (and, in some embodiments, at least the sealing ball 208, or any other component) may be made of or otherwise comprise a degradable metal material configured to slowly degrade or dissolve within a wellbore environment. In other embodiments, other components of the wellbore isolation device 200 may also be made of or otherwise comprise a degradable metal material including, but not limited to, the upper and lower slips 216a,b, the upper and lower slip wedges 218a,b, and the mule shoe 222. In addition to the foregoing, other components of the wellbore isolation device 200 that may be made of or otherwise comprise a degradable metal material include extrusion limiters and shear pins associated with the wellbore isolation device 200. The foregoing structural elements or components of the wellbore isolation device 200 are collectively referred to herein as "the components" in the following discussion. In some embodiments, as discussed below, the sealing ball 208 may be composed of a degradable metal material, a degradable elastomer, a degradable glass material, and any combination thereof. In some embodiments, as discussed in greater detail below, the packer element 220 is composed of a non-degradable or minimally degradable elastomer, or a degradable elastomer. As used herein, the term "minimally degradable" refers to degradation of no more than about 50% by volume of the material in a wellbore environment.

The degradable metal material, degradable elastomer, and/or degradable glass material (collectively simply "degradable substances") for use in forming components of the wellbore isolation device 200 may degrade, at least in part, in the presence of an aqueous fluid (e.g., a treatment fluid), a hydrocarbon fluid (e.g., a produced fluid in the formation or a treatment fluid), an elevated temperature, and any combination thereof. That is, the degradable substances may wholly degrade or partially degrade. The aqueous fluid that may degrade the degradable substances may include, but is not limited to, fresh water, saltwater (e.g., water containing one or more salts dissolved therein), brine (e.g., saturated salt water), seawater, or combinations thereof. Accordingly, the aqueous fluid may comprise ionic salts. The aqueous fluid may come from the wellbore 106 itself (i.e., the subterranean formation) or may be introduced by a wellbore operator. The hydrocarbon fluid may include, but is not limited to, crude oil, a fractional distillate of crude oil, a fatty derivative of an acid, an ester, an ether, an alcohol, an amine, an amide, or an imide, a saturated hydrocarbon, an unsaturated hydrocarbon, a branched hydrocarbon, a cyclic hydrocarbon, and any combination thereof. The elevated temperature may be above the glass transition temperature of the degradable substance, such as when the degradable elastomer is a thiol-based polymer, or may be a temperature greater than about 60° C. (140° F.).

The degradable substances forming at least a portion of the wellbore isolation device 200 may degrade by a number of mechanisms. For example, the degradable substances may degrade by swelling, dissolving, undergoing a chemical change, undergoing thermal degradation in combination with any of the foregoing, and any combination thereof. Degradation by swell involves the absorption by the degradable substance of a fluid in the wellbore environment such that the mechanical properties of the degradable substance degrade. That is, the degradable substance continues to absorb the fluid until its mechanical properties are no longer capable of maintaining the integrity of the degradable substance and it at least partially falls apart. In some embodiments, a degradable substance may be designed to only partially degrade by swelling in order to ensure that the mechanical properties of the component of the wellbore isolation device 200 formed from the degradable substance is sufficiently capable of lasting for the duration of the specific operation in which it is utilized. Degradation by dissolving involves use of a degradable substance that is soluble or otherwise susceptible to a fluid in the wellbore environment (e.g., an aqueous fluid or a hydrocarbon fluid), such that the fluid is not necessarily incorporated into the degradable substance (as is the case with degradation by swelling), but becomes soluble upon contact with the fluid. Degradation by undergoing a chemical change may involve breaking the bonds of the backbone of the degradable substance (e.g., polymer backbone) or causing the bonds of the degradable substance to crosslink, such that the degradable substance becomes brittle and breaks into small pieces upon contact with even small forces expected in the wellbore environment. Thermal degradation involves a chemical decomposition due to heat, such as the heat present in a wellbore environment. Thermal degradation of some degradable substances described herein may occur at wellbore environment temperatures of greater than about 93° C. (or about 200° F.), or greater than about 50° C. (or about 122° F.). Each degradation method may work in concert with one or more of the other degradation methods, without departing from the scope of the present disclosure.

Referring now to the slowly degradable metal material of the present disclosure, the rate of degradation of the degradable metal material may depend on a number of factors including, but not limited to, the type of degradable metal material selected and the conditions of the wellbore environment. As used herein, a "slowly degradable metal material" (also referred to simply as "degradable metal material" herein) may refer to the rate of dissolution of the degradable metal material, and the rate of dissolution may correspond to a rate of material loss at a particular temperature and within particular wellbore conditions. For instance, in at least one embodiment, a slowly degradable metal material may comprise a material that exhibits a degradation rate in an amount in the range of a lower limit of 0.01 milligrams per square centimeters ($mg/cm^2$) to about 10 $mg/cm^2$ per hour at a temperature of 200° F. (93.3° C.) while exposed to a 15% potassium chloride (KCl) solution, encompassing any value and subset therebetween. For example, the degradation rate may be about 0.01 $mg/cm^2$ to about 2.5 $mg/cm^2$, or about 2.5 $mg/cm^2$ to about 5 $mg/cm^2$, or about 5 $mg/cm^2$ to about 7.5 $mg/cm^2$, or about 7.5 $mg/cm^2$ to about 10 $mg/cm^2$ per hour at a temperature of 200° F. (93.3° C.) while exposed to a 15% potassium chloride (KCl) solution, encompassing any value and subset therebetween. In other instances, a slowly degradable material may comprise a material that loses about 0.1% to about 10% of its total mass per day at 200° F. (93.3° C.) in 15% KCl solution, encompassing any value and subset therebetween. For example, in some embodiments the degradable metal material may lose about 0.1% to about 2.5%, or about 2.5% to about 5%, or about 5% to about 7.5%, or about 7.5% to about 10% of its total mass per day at 200° F. (93.3° C.) in 15% KCl solution, encompassing any value and subset therebetween. Each of these values representing the slowly degradable metal material is critical to the embodiments of the present disclosure and may depend on a number of factors including, but not limited to, the type of degradable metal material, the wellbore environment, and the like.

In some embodiments, the degradation rate of the degradable metal material may be somewhat faster, such that the degradable metal material exhibits a degradation rate in an amount of greater than about 10 $mg/cm^2$ per hour at 200° F. (93.3° C.) in 15% KCl solution. In other embodiments, the degradable metal material exhibits a degradation rate such that greater than about 10% of its total mass is lost per day at 200° F. (93.3° C.) in 15% KCl solution.

The degradation of the degradable metal material may be in the range of from about 5 days to about 40 days, encompassing any value or subset therebetween. For example, the degradation may be about 5 days to about 10 days, or about 10 days to about 20 days, or about 20 days to about 30 days, or about 30 days to about 40 days, encompassing any value and subset therebetween. Each of these values representing the slowly degradable metal material is critical to the embodiments of the present disclosure and may depend on a number of factors including, but not limited to, the type of degradable metal material, the wellbore environment, and the like.

Suitable slowly degradable metal materials that may be used in accordance with the embodiments of the present disclosure include galvanically-corrodible or degradable metals and metal alloys. Such metals and metal alloys may be configured to degrade via an electrochemical process in which the galvanically-corrodible metal corrodes in the presence of an electrolyte (e.g., brine or other salt-containing fluids present within the wellbore 106). As used herein, an "electrolyte" is any substance containing free ions (i.e., a positively or negatively charged atom or group of atoms) that make the substance electrically conductive. The electrolyte can be selected from the group consisting of, solutions of an acid, a base, a salt, and combinations thereof. A salt can be dissolved in water, for example, to create a salt solution. Common free ions in an electrolyte include, but are not limited to, sodium ($Na^+$), potassium ($K^+$), calcium ($Ca^{2+}$), magnesium ($Mg^{2+}$), chloride ($Cl^-$), bromide ($B^-$) hydrogen phosphate ($HPO_4^{2-}$), hydrogen carbonate ($HCO_3^-$), and any combination thereof. Preferably, the electrolyte contains chloride ions. The electrolyte can be a fluid that is introduced into the wellbore 106 or a fluid emanating from the wellbore 106, such as from a surrounding subterranean formation (e.g., the formation 108 of FIG. 1).

Suitable degradable metal materials include, but are not limited to, gold, gold-platinum alloys, silver, nickel, nickel-copper alloys, nickel-chromium alloys, copper, copper alloys (e.g., brass, bronze, etc.), chromium, tin, aluminum, aluminum alloys, iron, zinc, magnesium, magnesium alloys, beryllium, any alloy of the aforementioned materials, and any combination thereof.

Suitable magnesium alloys include alloys having magnesium at a concentration in the range of from about 40% to about 99% by weight of the magnesium, encompassing any value and subset therebetween. In some embodiments, the magnesium concentration may be in the range of about 40% to about 99%, 70% to about 98%, and preferably about 80% to about 95% by weight of the magnesium alloy, encompassing any value and subset therebetween. Each of these values is critical to the embodiments of the present disclosure and may depend on a number of factors including, but not limited to, the type of magnesium alloy, the desired degradability of the magnesium alloy, and the like.

Magnesium alloys comprise at least one other ingredient besides the magnesium. The other ingredients can be selected from one or more metals, one or more non-metals, or a combination thereof. Suitable metals that may be alloyed with magnesium include, but are not limited to, lithium, sodium, potassium, rubidium, cesium, beryllium, calcium, strontium, barium, aluminum, gallium, indium, tin, thallium, lead, bismuth, scandium, titanium, vanadium, chromium, manganese, iron, cobalt, nickel, copper, zinc, yttrium, zirconium, niobium, molybdenum, ruthenium, rhodium, palladium, praseodymium, silver, lanthanum, hafnium, tantalum, tungsten, terbium, rhenium, osmium, iridium, platinum, gold, neodymium, gadolinium, erbium, oxides of any of the foregoing, and any combinations thereof.

Suitable non-metals that may be alloyed with magnesium include, but are not limited to, graphite, carbon, silicon, boron nitride, and combinations thereof. The carbon can be in the form of carbon particles, fibers, nanotubes, fullerenes, and any combination thereof. The graphite can be in the form of particles, fibers, graphene, and any combination thereof. The magnesium and its alloyed ingredient(s) may be in a solid solution and not in a partial solution or a compound where inter-granular inclusions may be present. In some embodiments, the magnesium and its alloyed ingredient(s) may be uniformly distributed throughout the magnesium alloy but, as will be appreciated, some minor variations in the distribution of particles of the magnesium and its alloyed ingredient(s) can occur. In other embodiments, the magnesium alloy is a sintered construction.

In some embodiments, the magnesium alloy may have a yield stress in the range of from about 20000 pounds per square inch (psi) to about 50000 psi, encompassing any value and subset therebetween. For example, in some embodiments, the magnesium alloy may have a yield stress of about 20000 psi to about 30000 psi, or about 30000 psi to about 40000 psi, or about 40000 psi to about 50000 psi, encompassing any value and subset therebetween.

Suitable aluminum alloys include alloys having aluminum at a concentration in the range of from about 40% to about 99% by weight of the aluminum alloy, encompassing any value and subset therebetween. For example, suitable magnesium alloys may have aluminum concentrations of about 40% to about 50%, or about 50% to about 60%, or about 60% to about 70%, or about 70% to about 80%, or about 80% to about 90%, or about 90% to about 99% by weight of the aluminum alloy, encompassing any value and subset therebetween. Each of these values is critical to the embodiments of the present disclosure and may depend on a number of factors including, but not limited to, the type of aluminum alloy, the desired degradability of the aluminum alloy, and the like.

The aluminum alloys may be wrought or cast aluminum alloys and comprise at least one other ingredient besides the aluminum. The other ingredients can be selected from one or more any of the metals, non-metals, and combinations thereof described above with reference to magnesium alloys, with the addition of the aluminum alloys additionally being able to comprise magnesium.

Suitable degradable metal materials for use in the embodiments described herein also include micro-galvanic metals or materials, such as solution-structured galvanic materials. An example of a solution-structured galvanic material is a magnesium alloy containing zinc (Zn), where different domains within the alloy contain different percentages of Zn. This leads to a galvanic coupling between these different domains, which causes micro-galvanic corrosion and degradation. Micro-galvanically corrodible magnesium alloys could also be solution structured with other elements such as zinc, aluminum, manganese, nickel, cobalt, calcium, iron, carbon, tin, silver, copper, titanium, rare earth elements, etc. Examples of solution-structured micro-galvanically-corrodible magnesium alloys include ZK60, which includes 4.5% to 6.5% zinc, minimum 0.25% zirconium, 0% to 1% other, and balance magnesium; AZ80, which includes 7.5% to 9.5% aluminum, 0.2% to 0.8% zinc, 0.12% manganese, 0.015% other, and balance magnesium; and AZ31, which includes 2.5% to 3.5% aluminum, 0.5% to 1.5% zinc, 0.2% manganese, 0.15% other, and the balance magnesium. Each of these examples is % by weight of the metal alloy. In some embodiments, "other" may include unknown materials, impurities, additives, and any combination thereof.

In some embodiments, the slowly degradable metal material forming at least the mandrel 206 (and, in some embodiments, at least the sealing ball 208, or any other component) of a wellbore isolation device 200 may comprise dissimilar metals that generate a galvanic coupling that either accelerates or decelerates the degradation rate of the mandrel 206, or of another component of the wellbore isolation device 200 that is at least partially composed of a degradable substance, whether a degradable metal material or a degradable non-metal material (e.g., a degradable elastomer), such as the packer element 220. As will be appreciated, such embodiments may depend on where the dissimilar metals lie on the galvanic series. In at least one embodiment, a galvanic coupling may be generated by embedding or attaching a cathodic substance or piece of material into an anodic component. For instance, the galvanic coupling may be generated by dissolving aluminum in gallium. A galvanic coupling may also be generated by using a sacrificial anode coupled to the degradable material. In such embodiments, the degradation rate of the degradable metal material may be decelerated until the sacrificial anode is dissolved or otherwise corroded away. As an example, the mandrel 206 and the sealing ball 208 may both be composed of a degradable metal material, and the mandrel 206 may be a more electronegative material than the sealing ball 208. In such an embodiment, the galvanic coupling between the mandrel 206 and the sealing ball 208 may cause the mandrel 206 to act as an anode and degrade before the sealing ball 208. Once the mandrel 206 has degraded, the sealing ball 208 would dissolve or degrade independently.

In some embodiments, the density of the component of the wellbore isolation device 200 composed of a degradable metal material (e.g., at least the mandrel 206), as described herein, may exhibit a density that is relatively low. The low density may prove advantageous in ensuring that the wellbore isolation device 200 may can be placed in extended-reach wellbores, such as extended-reach lateral wellbores. As will be appreciated, the more components of the wellbore isolation device composed of the degradable metal material having a low density, the lesser the density of the wellbore isolation device 200 as a whole. In some embodiments, the degradable metal material is a magnesium alloy or an aluminum alloy and may have a density less than 3 g/cm$^3$ or less than 2 g/cm$^3$. In other embodiments where the degradable metal material is a material that is lighter than steel, the density of the may be less than 5 g/cm$^3$. By way of example, the inclusion of lithium in a magnesium alloy can reduce the density of the alloy.

In some embodiments, the packer element 220 of the wellbore isolation device 200 may be composed of an elastomer that is sufficiently resilient (i.e., elastic) to provide a fluid seal between two portions of a wellbore section. In a preferred embodiment, the packer element 220 is composed of a degradable elastomer. It may be desirable that the amount of degradation is capable of causing the packer element 220 to no longer maintain a fluid seal in the wellbore capable of maintaining differential pressure. However, because the mandrel 206 and the sealing ball 208 are additionally composed of a degradable substance, the degradation of at least the three components may not necessitate that the packer element 220 degrade to the point of breaking the fluid seal on its own.

The degradation rate of the degradable elastomer for forming the packer element 220 may be accelerated, rapid, or normal, as defined herein. Accelerated degradation may be in the range of from about 2 hours to about 36 hours, encompassing any value or subset therebetween. Rapid degradation may be in the range of from about 36 hours to about 14 days, encompassing any value or subset therebetween. Normal degradation may be in the range of from about 14 days to about 120 days, encompassing any value or subset therebetween. Accordingly, the degradation may be between about 120 minutes to about 120 days. For example, the degradation of the degradable elastomer may be about 2 hours to about 30 days, or about 30 days to about 60 days, or about 60 days to about 90 days, or about 90 days to about 120 days, encompassing any value and subset therebetween. Each of these values is critical and depending on a number of factors including, but not limited to, the type of degradable elastomer selected, the conditions of the wellbore environment, and the like.

The degradable elastomer forming at least a portion of the packer element 220 may be a material that is at least partially degradable in a wellbore environment including, but not limited to, a polyurethane rubber (e.g., cast polyurethanes, thermoplastic polyurethanes, polyethane polyurethanes); a polyester-based polyurethane rubber (e.g., lactone polyester-based thermoplastic polyurethanes); a polyether-based polyurethane rubber; a thiol-based polymer (e.g., 1,3,5,-triacryloylhexahydro-1,3,5-triazine); a thiol-epoxy polymer (e.g., having an epoxide functional group, such as bisphenol-A diglycidyl ether, triglycidylisocyanurate, and/or trimethylolpropane triglycidyl ether); a hyaluronic acid rubber; a polyhydroxobutyrate rubber; a polyester elastomer; a polyester amide elastomer; a starch-based resin (e.g., starch-poly (ethylene-co-vinyl alcohol), a starch-polyvinyl alcohol, a starch-polylactic acid, starch-polycaprolactone, starch-poly (butylene succinate), and the like); a polyethylene terephthalate polymer; a polyester thermoplastic (e.g., polyether/ester copolymers, polyester/ester copolymers); a polylactic acid polymer; a polybutylene succinate polymer; a polyhydroxy alkanoic acid polymer; a polybutylene terephthalate polymer; a polysaccharide; chitin; chitosan; a protein; an aliphatic polyester; poly($\epsilon$-caprolactone); a poly(hydroxybutyrate); poly(ethyleneoxide); poly(phenyllactide); a poly (amino acid); a poly(orthoester); polyphosphazene; a polylactide; a polyglycolide; a poly(anhydride) (e.g., poly (adipic anhydride), poly(suberic anhydride), poly(sebacic anhydride), poly(dodecanedioic anhydride), poly(maleic anhydride), and poly(benzoic anhydride), and the like); a polyepichlorohydrin; a copolymer of ethylene oxide/polyepichlorohydrin; a terpolymer of epichlorohydrin/ethylene oxide/allyl glycidyl ether; copolymers thereof; terpolymers thereof; and any combination thereof.

In some embodiments, the degradable elastomer selected for use in forming the packer element 220 may be a polyurethane rubber, a polyester-based polyurethane rubber, or a polyether-based polyurethane rubber (collectively simply "polyurethane-based rubbers). These polyurethane-based rubbers degrade in water through a hydrolytic reaction, although other degradation methods may also affect the degradability of the polyurethane-based rubbers. As used herein, the term "hydrolytic reaction," and variants thereof (e.g., "hydrolytic degradation") refers to the degradation of a material by cleavage of chemical bonds in the presence of (e.g., by the addition of) an aqueous fluid. Polyurethane-based rubbers traditionally are formed by reacting a polyisocyanate with a polyol. In the embodiments described herein, although non-limiting, the polyol for forming a polyurethane-based rubber may be a natural oil polyol, a polyester polyol (e.g., polybutadienes (e.g., polybutanediol adipate), polycaprolactones, polycarbonates, and the like), or a polyether polyol (e.g., polytetramethylene ether glycol, polyoxypropylene-glycol, polyoxyethylene glycol, and the like). Because polyether polyols are typically hydrolytically more reactive than polyester polyols and natural oil polyols, polyether polyols may be preferred, particularly when the degradation of the degradable elastomer is solely based on aqueous fluid contact and not additionally on other degradation stimuli. However, either polyol may be used to form the polyurethane-based rubber for use as the degradable elastomer described herein, and each is critical to the disclosed embodiments, as the amount of desired degradation over time may depend on a number of factors including the conditions of the subterranean formation, the subterranean formation operation being performed, and the like. Combinations of these polyols may also be used, without departing from the scope of the present disclosure.

Accordingly, the rate of hydrolytic degradation of a polyurethane-based rubber for use as the degradable elastomers described herein may be adjusted and controlled based on the order of the polyol addition, as well as the polyol properties and quantities. As an example, in some embodiments, the amount of polyol is included in an amount in the range of from about 0.25 to about 2 stoichiometric ratio of the polyisocyanate in the polyurethane-based rubber, encompassing any value and subset therebetween. For example, the polyol may be included in an amount of about 0.25 to about 0.5, or about 0.5 to about 1, or about 1 to about 1.5, or about 1.5 to about 2 stoichiometric ratio of the polyisocyanate in the polyurethane-based rubber, encompassing any value and subset therebetween. Each of these values is critical to the embodiments described herein and may depend on a number of factors including, but not limited to, the desired hydrolytic degradation rate, the type of polyol(s) selected, the type of subterranean formation being performed, and the like.

In some embodiments, where the degradable elastomer selected is a polyurethane-based rubber for use in forming the packer element 220, the inclusion of a low functionality initiator may impart flexibility to thereto. Such low functionality initiators may include, but are not limited to dipropylene glycol, glycerine, sorbitol/water solution, and any combination thereof. As used herein, the term "low functionality initiator," and grammatical variants thereof, refers to the average number of isocyanate reactive sites per molecule of in the range of from about 1 to about 5. These low functionality initiators impart flexibility to the packer element 220 and may be included in the polyurethane-based rubbers described herein in an amount in the range of from about 1% to about 50% by weight of the polyol in the polyurethane-based rubber, encompassing any value and subset therebetween. For example, the low functionality initiator(s) may be included in the polyurethane-based rubbers in an amount of about 1% to about 12.5%, or about 12.5% to about 25%, or about 25% to about 37.5%, or about 37.5% to about 50% by weight of the polyol in the polyurethane-based rubber, encompassing any value and subset therebetween. Additionally, in some embodiments, higher molecular weight polyols for use in forming the polyurethane-based rubbers described herein may impart flexibility to the packer element 220 described herein. For example, in some embodiments, the molecular weight of the selected polyols may be in the range of from about 200 Daltons (Da) to about 20000 Da, encompassing any value and subset therebetween. For example, the molecular weight of the polyols may be about 200 Da to about 5000 Da, or about 5000 Da to about 10000 Da, or about 10000 Da to about 15000 Da, or about 15000 Da to about 20000 Da, encompassing any value and subset therebetween. Each of these values is critical to the embodiments described herein and may depend on a number of factors including, but not limited to, the desired flexibility of the degradable elastomer (and thus, e.g., the packer element 220), the type of subterranean formation operation being performed, the conditions in the subterranean formation, and the like.

In some embodiments, the degradable elastomer described herein may be formed from a thiol-based polymer. As used herein, the term "thiol" is equivalent to the term "sulfhydryl." The thiol-based polymer may comprise at least one thiol functional group. In some embodiments, the thiol-based polymer may comprise thiol functional groups in the range of from about 1 to about 22, encompassing every value and subset therebetween. For example, the thiol-based polymer may comprise thiol functional groups in an amount of about 1 to about 5, or 5 to about 10, or 10 to about 15, or 15 to about 20, or 20 to about 22, encompassing any value and subset therebetween. In other embodiments, the thiol-based polymer may comprise even a greater number of thiol functional groups. Each of these values is critical to the embodiments of the present disclosure and may depend on a number of factors including, but not limited to, the desired degradation rate, the desired degradation process, and the like.

The thiol-based polymer may be, but is not limited to, a thiol-ene reaction product, a thiol-yne reaction product, a thiol-epoxy reaction product, and any combination thereof. The thiol-based polymers, whether the reaction product of thiol-ene, thiol-yne, or thiol-epoxy, may be referred to herein as generally being the reaction product of a thiol functional group and an unsaturated functional group, and may be formed by click chemistry. The thiol functional group is an organosulfur compound that contains a carbon-bonded sulfhydryl, represented by the formula —C—SH or R—SH, where R represents an alkane, alkene, or other carbon-containing group of atoms.

Thiol-ene reactions may be characterized as the sulfur version of a hydrosilylation reaction. The thiol-ene reaction product may be formed by the reaction of at least one thiol functional group with a variety of unsaturated functional groups including, but not limited to, a maleimide, an acrylate, a norborene, a carbon-carbon double bond, a silane, a Michael-type nucleophilic addition, and any combination thereof. As used herein, the term "Michael-type nucleophilic addition," and grammatical variants thereof, refers to the nucleophilic addition of a carbanion or another nucleophile to an $\alpha,\beta$-unsaturated carbonyl compound, having the general structure (O═C)—$C^\alpha$═$C^\beta$—. An example of a suitable thiol-ene reaction product may include, but is not limited to, 1,3,5,-triacryloylhexahydro-1,3,5-triazine. Examples of suitable thiol-ene/silane reaction products that may be used in forming at least a portion of the downhole tool 100 (FIG. 1) or component thereof include, but are not limited to, the following Formulas 1-6:

-continued

Formula 3

Formula 4

Formula 5

Formula 6

The thiol-yne reaction products may be characterized by an organic addition reaction between a thiol functional group and an alkyne, the alkyne being an unsaturated hydrocarbon having at least one carbon-carbon triple bond.

The addition reaction may be facilitated by a radical initiator or UV irradiation and proceeds through a sulfanyl radical species. The reaction may also be amine-mediated, or transition-metal catalyzed.

The thiol-epoxy reaction products may be prepared by a thiol-ene reaction with at least one epoxide functional group. Suitable epoxide functional groups may include, but are not limited to, a glycidyl ether, a glycidyl amine, or as part of an aliphatic ring system. Specific examples of epoxide functional groups may include, but are not limited to, bisphenol-A diglycidyl ether, triglycidylisocyanurate, trimethylolpropane triglycidyl ether, and any combination thereof. The thiol-epoxy reaction products may proceed by one or more of the mechanisms presented below; however, other mechanisms may also be used without departing from the scope of the present disclosure:

As mentioned above, the thiol-based polymer may comprise at least one thiol functional group and at least one degradable functional group. Such degradable functional groups may include, but are not limited to, one or more of a degradable monomer, a degradable oligomer, or a degradable polymer. Specific examples of degradable functional groups may include, but are not limited to, an acrylate, a lactide, a lactone, a glycolide, an anhydride, a lactam, an allyl, a polyethylene glycol, a polyethylene glycol-based hydrogel, an aerogel, a poly(lactide), a poly(glycolic acid), a poly(vinyl alcohol), a poly(N-isopropylacrylamide), a poly(ε-caprolactone, a poly(hydroxybutyrate), a polyanhydride, an aliphatic polycarbonate, an aromatic polycarbonate, a poly(orthoester), a poly(hydroxyl ester ether), a poly(orthoester), a poly(amino acid), a poly(ethylene oxide), a polyphosphazene, a poly(phenyllactide), a poly(hydroxybutyrate), a dextran, a chitin, a cellulose, a protein, an aliphatic polyester, and any combination thereof.

In some embodiments, the thiol-based polymer comprises at least one polyethylene glycol-based hydrogel, such as one formed by a four-arm polyethylene glycol norbornene that is crosslinked with dithiol containing crosslinkers to form a chemically crosslinked hydrogel to impart swelling properties. The swelling properties of such a hydrogel may vary depending on a number of factors including, but not limited to, network density, the degree of crosslinking, and any combination thereof. In some embodiments, the degree of crosslinking may be desirably increased in order to achieve a higher tensile modulus and reduced swelling percentage.

The sealing ball 208 may be composed of the degradable metal material or the degradable elastomer described above. For example, the sealing ball 208 may be made of polyglycolic acid (PGA) and/or polylactic acid (PLA). In other embodiments, the sealing ball 208 may be composed of a degradable glass material including, but not limited to, glass polyalkenoate, borate glass polyalkenoate, calcium phosphate glass, polylactic acid/calcium phosphate glass, phosphate glass, silica glass, and any combination thereof. Additionally, the sealing ball 208 may be any combination of the degradable metal material, the degradable elastomer, and/or the degradable glass material, and may additionally comprise an additive such as those discussed below (e.g., thermoplastic addition, reinforcing agent addition, and the like), without departing from the scope of the present disclosure.

Any other component of the wellbore isolation device 200 may additionally be composed of the degradable metal material, the degradable elastomer, or the degradable glass material described herein. Generally, the degradable metal material and the degradable glass material are rigid and provide structure, whereas the degradable elastomer is resilient (i.e., elastic), which will dictate the particular components of the wellbore isolation device 200 that are composed of either of these materials. Additionally, in other embodiments, any component of the wellbore isolation device 200 may be a degradable non-metal material. Any non-degradable material (e.g., metals, plastics, glass, and the like) may additionally be used to form a component of the wellbore isolation device 200.

In some embodiments, the degradable substance(s) forming one or more components of the wellbore isolation device 200 may have a thermoplastic polymer embedded therein. In some instances, the degradable elastomer is itself a thermoplastic, in which case a different thermoplastic polymer may be embedded therein, in accordance with the embodiments described herein. The thermoplastic polymer may modify the strength, resiliency, or modulus of a component of the wellbore isolation device 200 (e.g., the packer element 220) and may also control the degradation rate thereof. Suitable thermoplastic polymers may include, but are not limited to, polypropylene, an aliphatic polyester (e.g., polyglycolic acid, polylactic acid, polycaprolactone, polyhydroxyalkanoate, polyhydroxyalkanoiate, polyhydroxybutyrate, polyethylene adipate, polybutylene succinate, poly(lactic-co-glycolic) acid, poly(3-hydroxybutyrate-co-3-hyroxyvalerate, polycarbonate, and the like), and any combination thereof. In some situations, as stated above, the degradable substance may be a thermoplastic, which may be combined with one or more degradable substances (in combination) or a thermoplastic listed above. The amount of thermoplastic polymer that may be embedded in the degradable substance forming may be any amount that confers a desirable quality (e.g., elasticity) without affecting the desired amount of degradation. In some embodiments, the thermoplastic polymer may be included in an amount in the range of from about 1% to about 91% by weight of the degradable substance, encompassing any value or subset therebetween. For example, the thermoplastic polymer may be included in an amount of about 1% to about 25%, or about 25% to about 50%, or about 50% to about 75%, or about 75% to about 91% by weight of the degradable substance, encompassing any value or subset therebetween. Each of these values is critical to the embodiments described herein and may depend on a number of factors including, but not limited to, the desired flexibility of the degradable substance, the desired degradation rate of the degradable substance, the conditions of the subterranean formation, the subterranean formation operation being performed, and the like.

A reinforcing agent may additionally be included in the degradable substance, which may increase the strength, stiffness, or salt creep resistance of the component of the wellbore isolation device 200 comprising at least a portion of the degradable substance. Such reinforcing agents may be a particulate, a fiber, a fiber weaver, and any combination thereof.

The particulate may be of any size suitable for embedding in the degradable elastomer, such as in the range of from about 400 mesh to about 40 mesh, U.S. Sieve Series, and encompassing any value or subset therebetween. For example, the size of particulate for embedding in the degradable elastomer may be in the range of about 400 mesh to about 300 mesh, or about 300 mesh to about 200 mesh, or about 200 mesh to about 100 mesh, or about 100 mesh to about 40 mesh, encompassing any value and subset therebetween. Moreover, there is no need for the particulates to be sieved or screened to a particular or specific particle mesh size or particular particle size distribution, but rather a wide or broad particle size distribution can be used, although a narrow particle size distribution is also suitable.

In some embodiments, the particulates may be substantially spherical or non-spherical. Substantially non-spherical proppant particulates may be cubic, polygonal, or any other non-spherical shape. Such substantially non-spherical particulates may be, for example, cubic-shaped, rectangular-shaped, rod-shaped, ellipse-shaped, cone-shaped, pyramid-shaped, planar-shaped, oblate-shaped, or cylinder-shaped. That is, in embodiments wherein the particulates are substantially non-spherical, the aspect ratio of the material may range such that the material is planar to such that it is cubic, octagonal, or any other configuration.

Particulates suitable for use as reinforcing agents in the embodiments described herein may comprise any material suitable for use in the degradable substance that provides one or more of stiffness, strength, or creep resistance, or any other added benefit. Suitable materials for these particulates may include, but are not limited to, organophilic clay, silica flour, metal oxide, sand, bauxite, ceramic materials, glass materials, polymer materials (e.g., ethylene vinyl acetate or composite materials), polytetrafluoroethylene materials, nut shell pieces, cured resinous particulates comprising nut shell pieces, seed shell pieces, cured resinous particulates comprising seed shell pieces, fruit pit pieces, cured resinous particulates comprising fruit pit pieces, wood, composite particulates, and combinations thereof. Suitable composite particulates may comprise a binder and a filler material wherein suitable filler materials include silica, alumina, fumed carbon, carbon black, graphite, mica, titanium dioxide, barite, meta-silicate, calcium silicate, kaolin, talc, zirconia, boron, fly ash, hollow glass microspheres, solid glass, and combinations thereof.

The fibers for use as reinforcing agents in the degradable elastomer may be of any size and material capable of being included therein. In some embodiments, the fibers may have a length of less than about 1.25 inches and a width of less than about 0.01 inches. In some embodiments, a mixture of different sizes of fibers may be used. Suitable fibers may be formed from any material suitable for use as a particulate, as described previously, as well as materials including, but not limited to, carbon fibers, carbon nanotubes, graphene, fullerene, a ceramic fiber, a plastic fiber, a glass fiber, a metal fiber, and any combination thereof. In some embodiments, the fibers may be woven together to form a fiber weave for use in the degradable substance.

In some embodiments, the reinforcing agent may be included in the degradable substance in an amount in the range of from about 1% to about 91% by weight of the degradable substance, encompassing any value or subset therebetween. For example, the reinforcing agent may be included in an amount of about 1% to about 25%, or about 25% to about 50%, or about 50% to about 75%, or about 75% to about 91% by weight of the degradable substance, encompassing any value or subset therebetween. Each of these values is critical to the embodiments of the present disclosure and may depend on a number of factors including, but not limited to, the desired stiffness of the degradable substance, the desired strength of the degradable substance, the desired salt creep resistance of the degradable substance, the type of degradable substance selected, and the like, and any combination thereof.

According to an embodiment, the degradable substance may include one or more tracers present therein. The tracer(s) can be, without limitation, radioactive, chemical, electronic, or acoustic. A tracer can be useful in determining real-time information on the rate of dissolution of the degradable substance. By being able to monitor the presence of the tracer, workers at the surface can make on-the-fly decisions that can affect the rate of dissolution of the remaining portions of the wellbore isolation device 200.

In some embodiments, the degradable substance may be at least partially encapsulated in a second material or "sheath" disposed on all or a portion of a given component of the wellbore isolation device 200. The sheath may be configured to help prolong degradation of the given component of the wellbore isolation device 200. The sheath may also serve to protect the component from abrasion within the wellbore 106. The sheath may be permeable, frangible, or comprise a material that is at least partially removable at a desired rate within the wellbore environment. In either scenario, the sheath may be designed such that it does not interfere with the ability of the wellbore isolation device 200 to form a fluid seal in the wellbore 106.

The sheath may comprise any material capable of use in a downhole environment and, depending on the component that the sheath encapsulates, the sheath may or may not be elastic such that it is able to expand with corresponding expansion of the component. For instance, a frangible sheath may break as the packer elements 220 expand to form a fluid seal, whereas a permeable sheath may remain in place on the packer elements 220 as they form the fluid seal. As used herein, the term "permeable" refers to a structure that permits fluids (including liquids and gases) therethrough and is not limited to any particular configuration.

The sheath may comprise any of the afore-mentioned degradable substances. In some embodiments, the sheath may be made of a degradable substance that degrades at a rate that is faster than that of the underlying degradable substance that forms the component. Other suitable materials for the sheath include, but are not limited to, a TEFLON® coating, a wax, a drying oil, a polyurethane, an epoxy, a cross-linked partially hydrolyzed polyacrylic, a silicate material, a glass, an inorganic durable material, a polymer, polylactic acid, polyvinyl alcohol, polyvinylidene chloride, a hydrophobic coating, paint, and any combination thereof.

In some embodiments, all or a portion of the outer surface of a given component of the wellbore isolation device 200 may be treated to impede degradation. For example, the outer surface of a given component may undergo a treatment that aids in preventing the degradable substance from degrading, or that aids in reducing the degradation rate. Suitable treatments may include, but are not limited to, an anodizing treatment, an oxidation treatment, a chromate conversion treatment, a dichromate treatment, a fluoride anodizing treatment, a hard anodizing treatment, and any combination thereof. As an example, an anodizing treatments may result in an anodized layer of material being deposited on the outer surface of a given component. The anodized layer may comprise materials such as, but not limited to, ceramics, metals, polymers, epoxies, elastomers, plastics, or any combination thereof and may be applied using any suitable processes known to those of skill in the art. Examples of suitable processes that result in an anodized layer include, but are not limited to, soft anodized coating, anodized coating, electroless nickel plating, hard anodized coating, ceramic coatings, carbide beads coating, plastic coating, thermal spray coating, high velocity oxygen fuel (HVOF) coating, a nano HVOF coating, a metallic coating.

In some embodiments, all or a portion of the outer surface of a given component of the wellbore isolation device 200 may be treated or coated with a substance configured to enhance degradation of the degradable material. For example, such a treatment or coating may be configured to remove a protective coating or treatment or otherwise accelerate the degradation of the degradable substance of the given component. An example is a galvanically-corroding metal coated with a layer of polyglycolic acid (PGA). In this example, the PGA would undergo hydrolysis and cause the surrounding fluid to become more acidic, which would accelerate the degradation of the underlying metal.

While the foregoing description and embodiments are directed primarily to a degradable or disappearing frac plug, those skilled in the art will readily recognize that the principles of the present disclosure could equally be applied to any traditional wellbore isolation device including, but not limited to, a bridge plug, a wellbore packer, a wiper plug, a cement plug, or any combination thereof. Moreover, while the foregoing description and embodiments are directed primarily to setting wellbore isolation devices within a casing 114 (FIGS. 1 and 2), the principles of the present disclosure are equally applicable to open hole applications.

Embodiments disclosed herein include Embodiment A, Embodiment B, and Embodiment C:

Embodiment A: A downhole tool comprising: a wellbore isolation device that provides a plurality of components including a mandrel, a packer element, and a sealing ball, wherein the mandrel defines a central flow passage that allows fluid flow in at least one direction through the wellbore isolation device, wherein at least a portion of the mandrel is composed of a degradable metal material, at least a portion of the packer element is composed of an elastomer, and at least a portion of the sealing ball is composed of a degradable substance, and wherein the degradable metal material and the degradable substance degrades upon exposure to a wellbore environment.

Embodiment B: A method comprising: introducing a downhole tool into a wellbore, wherein the downhole tool is a wellbore isolation device that provides a plurality of components including a mandrel, a packer element, and a sealing ball, wherein the mandrel defines a central flow passage that allows fluid flow in at least one direction through the wellbore isolation device, and wherein at least a portion of the mandrel is composed of a degradable metal material, at least a portion of the packer element is composed of an elastomer, and at least a portion of the sealing ball is composed of a degradable substance; anchoring the downhole tool within the wellbore at a target location; performing at least one downhole operation; and degrading the degradable metal material and the degradable substance upon exposure to a wellbore environment.

Embodiment C: A system comprising: a conveyance connected to a service rig and extending through a surface into a wellbore in a subterranean formation; and a downhole tool connected to the conveyance and placed in the wellbore, wherein the downhole tool is a wellbore isolation device that provides a plurality of components including a mandrel, a packer element, and a sealing ball, wherein the mandrel defines a central flow passage that allows fluid flow in at least one direction through the wellbore isolation device, wherein at least a portion of the mandrel is composed of a degradable metal material, at least a portion of the packer element is composed of an elastomer, and at least a portion of the sealing ball is composed of a degradable substance, and wherein the degradable metal material and the degradable substance degrades upon exposure to a wellbore environment.

Each of Embodiments A, B, and C may have one or more of the following additional elements in any combination:

Element 1: Wherein the wellbore isolation device is selected from the group consisting of a frac plug, a wellbore packer, a deployable baffle, and any combination thereof.

Element 2: Wherein the wellbore isolation device is a frac plug and the sealing ball is a frac ball.

Element 3: Wherein the degradable metal material is selected from the group consisting of gold, a gold-platinum alloy, silver, nickel, a nickel-copper alloy, a nickel-chromium alloy, copper, a copper alloy, chromium, tin, aluminum, an aluminum alloy, iron, zinc, magnesium, a magnesium alloy, beryllium, any alloy thereof, and any combination thereof.

Element 4: Wherein the elastomer is minimally degradable such that no more than about 50% by volume of the elastomer degrades in the wellbore environment.

Element 5: Wherein the elastomer is a degradable elastomer that degrades in the presence of the wellbore environment.

Element 6: Wherein the elastomer is a degradable elastomer that degrades in the presence of the wellbore environment, and the wellbore environment is selected from the group consisting of an aqueous fluid, a hydrocarbon fluid, and any combination thereof.

Element 7: Wherein the elastomer is a degradable elastomer that degrades in the presence of the wellbore environment, the degradable elastomer selected from the group consisting of a polyurethane rubber; a polyester-based polyurethane rubber; a polyether-based polyurethane rubber; a thiol-based polymer; a thiol-epoxy polymer; a hyaluronic acid rubber; a polyhydroxobutyrate rubber; a polyester elastomer; a polyester amide elastomer; a starch-based resin; a polyethylene terephthalate polymer; a polyester thermoplastic; a polylactic acid polymer; a polybutylene succinate polymer; a polyhydroxy alkanoic acid polymer; a polybutylene terephthalate polymer; a polysaccharide; chitin; chitosan; a protein; an aliphatic polyester; poly(ε-caprolactone); a poly(hydroxybutyrate); poly(ethyleneoxide); poly(phenyllactide); a poly(amino acid); a poly(orthoester); polyphosphazene; a polylactide; a polyglycolide; a poly(anhydride); a polyepichlorohydrin; a copolymer of ethylene oxide/polyepichlorohydrin; a terpolymer of epichlorohydrin/ethylene oxide/allyl glycidyl ether; any copolymer thereof; any terpolymer thereof; and any combination thereof.

Element 8: Wherein the degradable substance is selected from the group consisting of a degradable metal material, a degradable elastomer, a degradable glass material, and any combination thereof.

Element 9: Wherein the degradable substance is a degradable metal material selected from the group consisting of gold, a gold-platinum alloy, silver, nickel, a nickel-copper alloy, a nickel-chromium alloy, copper, a copper alloy, chromium, tin, aluminum, an aluminum alloy, iron, zinc, magnesium, a magnesium alloy, beryllium, any alloy thereof, and any combination thereof.

Element 10: Wherein the degradable substance is a degradable metal material and the rate of degradation of the mandrel and the sealing ball is in the range of from about 0.01 mg/cm$^2$ to about 10 mg/cm$^2$ per hour at 200° F. in 15% KCl brine.

Element 11: Wherein the degradable substance is a degradable metal material and the rate of degradation of the mandrel and the sealing ball is greater than about 10 mg/cm$^2$ per hour at 200° F. in 15% KCl brine.

Element 12: Wherein the degradable substance is a degradable metal material and the rate of degradation of the mandrel and the sealing ball is in the range of from about 0.1% to about 10% loss of total mass per day at 200° F. in 15% KCl brine.

Element 13: Wherein the degradable substance is a degradable metal material and the rate of degradation of the mandrel and the sealing ball is greater than about 10% loss of total mass per day at 200° F. in 15% KCl brine.

Element 14: Wherein the degradable substance is a degradable elastomer selected from the group consisting of a polyurethane rubber; a polyester-based polyurethane rubber; a polyether-based polyurethane rubber; a thiol-based polymer; a thiol-epoxy polymer; a hyaluronic acid rubber; a polyhydroxobutyrate rubber; a polyester elastomer; a polyester amide elastomer; a starch-based resin; a polyethylene terephthalate polymer; a polyester thermoplastic; a polylactic acid polymer; a polybutylene succinate polymer; a polyhydroxy alkanoic acid polymer; a polybutylene terephthalate polymer; a polysaccharide; chitin; chitosan; a protein; an aliphatic polyester; poly(ε-caprolactone); a poly(hydroxybutyrate); poly(ethyleneoxide); poly(phenyllactide); a poly(amino acid); a poly(orthoester); polyphosphazene; a polylactide; a polyglycolide; a poly(anhydride); a polyepichlorohydrin; a copolymer of ethylene oxide/polyepichlorohydrin; a terpolymer of epichlorohydrin/ethylene oxide/allyl glycidyl ether; any copolymer thereof; any terpolymer thereof; and any combination thereof.

Element 15: Wherein the degradable substance is a degradable glass material selected from the group consisting of a glass polyalkenoate, borate glass polyalkenoate, calcium phosphate glass, polylactic acid/calcium phosphate glass, phosphate glass, silica glass, and any combination thereof.

Element 16: Wherein the wellbore isolation device provides an inner diameter and an outer diameter, and wherein a minimum production flow area across the wellbore isolation device is selected from the group consisting of: a first flow area across the wellbore isolation device of at least 1/25 a total flow area of a casing at a location of the wellbore isolation device within a wellbore, a second flow area resulting from the inner diameter being at least 17% of the outer diameter, and any combination thereof.

Element 17: Wherein the wellbore isolation device provides an inner diameter and an outer diameter, and wherein a minimum production flow area across the wellbore isolation device is selected from the group consisting of: a first flow area across the wellbore isolation device of at least 1/25 a total flow area of a casing at a location of the wellbore isolation device within a wellbore, a second flow area resulting from the inner diameter being at least 17% of the outer diameter, and any combination thereof, and wherein the flow area across the wellbore isolation device includes any fluid flow area through the central flow passage and through any other flow paths through or around the wellbore isolation device.

Element 18: Wherein the wellbore isolation device provides an inner diameter and an outer diameter, and wherein a minimum production flow area across the wellbore isolation device is selected from the group consisting of: a first flow area across the wellbore isolation device of at least 1/25 a total flow area of a casing at a location of the wellbore isolation device within a wellbore, a second flow area resulting from the inner diameter being at least 17% of the outer diameter, and any combination thereof, wherein the flow area across the wellbore isolation device includes any fluid flow area through the central flow passage and through any other flow paths through or around the wellbore isolation device, and wherein the other flow paths comprise at least one flow channel defined longitudinally through the mandrel through which fluids may flow.

Element 19: Wherein the wellbore isolation device provides an inner diameter and an outer diameter, and wherein a minimum production flow area across the wellbore isolation device is selected from the group consisting of: a first flow area across the wellbore isolation device of at least 1/25 a total flow area of a casing at a location of the wellbore isolation device within a wellbore, a second flow area resulting from the inner diameter being at least 17% of the outer diameter, and any combination thereof, and wherein the inner diameter comprises a diameter of the central flow passage, and the outer diameter comprises a diameter of the wellbore isolation device in an unexpanded configuration.

Element 20: Wherein the wellbore isolation device provides an inner diameter and an outer diameter, and wherein a minimum production flow area across the wellbore isolation device is selected from the group consisting of: a first flow area across the wellbore isolation device of at least 1/25 a total flow area of a casing at a location of the wellbore isolation device within a wellbore, a second flow area resulting from the inner diameter being at least 17% of the outer diameter, and any combination thereof, and wherein first flow area across the wellbore isolation device is at least 1/9 of the total flow area of the casing at the location of the wellbore isolation device within the wellbore and the second flow area results from the inner diameter being at least 33% of the outer diameter.

By way of non-limiting example, exemplary combinations applicable to Embodiment A, B, and/or C include: 1, 3, 7, and 18; 1 and 2; 1, 15, 19, and 20; 4, 6, 7, and 11; 13, 14, 17, and 19; 1, 2, 3, 4, 5, 6, 7, 8, 9, 10, 11, 12, 13, 14, 15, 16, 17, 18, 19, and 20; 5, 9, 13, 14, and 15; 11, 12, and 20; 5, 8, 10, 16, and 18; and the like.

Therefore, the disclosed systems and methods are well adapted to attain the ends and advantages mentioned as well as those that are inherent therein. The particular embodiments disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope of the present disclosure. The systems and methods illustratively disclosed herein may suitably be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

What is claimed is:

1. A downhole tool comprising:
   a wellbore isolation device that provides a plurality of components including a mandrel, a packer element, and a sealing ball,
      wherein the mandrel defines a central flow passage that allows fluid flow in at least one direction through the wellbore isolation device,
      wherein at least a portion of the mandrel is composed of a slowly degradable metal material having a period for degradation in the range of from about 5 days to about 40 days, at least a portion of the packer element is composed of an elastomer, and at least a portion of the sealing ball is composed of a degradable substance,
      wherein the slowly degradable metal material and the degradable substance degrades upon exposure to a wellbore environment; and
      wherein the wellbore isolation device provides an inner diameter and an outer diameter, and wherein a minimum production flow area across the wellbore isolation device is selected from the group consisting of:
   a first flow area across the wellbore isolation device of at least 1/25 a total flow area of a casing at a location of the wellbore isolation device within a wellbore,
   a second flow area resulting from the inner diameter being at least 17% of the outer diameter, and
   any combination thereof.

2. The downhole tool of claim 1, wherein the wellbore isolation device is selected from the group consisting of a frac plug, a wellbore packer, a deployable baffle, and any combination thereof.

3. The downhole tool of claim 1, wherein the wellbore isolation device is a frac plug and the sealing ball is a frac ball.

4. The downhole tool of claim 1, wherein the slowly degradable metal material is selected from the group consisting of gold, a gold-platinum alloy, silver, nickel, a nickel-copper alloy, a nickel-chromium alloy, copper, a copper alloy, chromium, tin, aluminum, an aluminum alloy, iron, zinc, magnesium, a magnesium alloy, beryllium, any alloy thereof, and any combination thereof.

5. The downhole tool of claim 1, wherein the elastomer is minimally degradable such that no more than about 50% by volume of the elastomer degrades in the wellbore environment.

6. The downhole tool of claim 1, wherein the elastomer is a degradable elastomer that degrades in the presence of the wellbore environment.

7. The downhole tool of claim 1, wherein the elastomer is a degradable elastomer that degrades in the presence of the wellbore environment, and the wellbore environment is selected from the group consisting of an aqueous fluid, a hydrocarbon fluid, and any combination thereof.

8. The downhole tool of claim 1, wherein the elastomer is a degradable elastomer that degrades in the presence of the wellbore environment, the degradable elastomer selected from the group consisting of a polyurethane rubber; a polyester-based polyurethane rubber; a polyether-based polyurethane rubber; a thiol-based polymer; a thiol-epoxy polymer; a hyaluronic acid rubber; a polyhydroxybutyrate rubber; a polyester elastomer; a polyester amide elastomer; a starch-based resin; a polyethylene terephthalate polymer; a polyester thermoplastic; a polylactic acid polymer; a polybutylene succinate polymer; a polyhydroxy alkanoic acid polymer; a polybutylene terephthalate polymer; a polysaccharide; chitin; chitosan; a protein; an aliphatic polyester; poly($\epsilon$-caprolactone); a poly(hydroxybutyrate); poly(ethyleneoxide); poly(phenyllactide); a poly(amino acid); a poly(orthoester); polyphosphazene; a polylactide; a polyglycolide; a poly(anhydride); a polyepichlorohydrin; a copolymer of ethylene oxide/polyepichlorohydrin; a terpolymer of epichlorohydrin/ethylene oxide/allyl glycidyl ether; any copolymer thereof; any terpolymer thereof; and any combination thereof.

9. The downhole tool of claim 1, wherein the degradable substance is selected from the group consisting of a degradable metal material, a degradable elastomer, a degradable glass material, and any combination thereof.

10. The downhole tool of claim 1, wherein the degradable substance is a degradable metal material selected from the group consisting of gold, a gold-platinum alloy, silver, nickel, a nickel-copper alloy, a nickel-chromium alloy, copper, a copper alloy, chromium, tin, aluminum, an aluminum alloy, iron, zinc, magnesium, a magnesium alloy, beryllium, any alloy thereof, and any combination thereof.

11. The downhole tool of claim 1, wherein the degradable substance is a slowly degradable metal material, rates of degradation of the slowly degradable metal materials of the mandrel and the sealing ball being in the range of from about 0.01 mg/cm$^2$ to about 10 mg/cm$^2$ per hour at 200° F. in 15% KCl brine.

12. The downhole tool of claim 1, wherein the degradable substance is a degradable metal, rates of degradation of the degradable metal materials of the mandrel and the sealing ball being greater than about 10 mg/cm$^2$ per hour at 200° F. in 15% KCl brine.

13. The downhole tool of claim 1, wherein the degradable substance is a slowly degradable metal material, rates of degradation of the slowly degradable metal materials of the mandrel and the sealing ball being in the range of from about 0.1% to about 10% loss of total mass per day at 200° F. in 15% KCl brine.

14. The downhole tool of claim 1, wherein the degradable substance is a degradable metal material, rates of degradation of the degradable metal materials of the mandrel and the sealing ball being greater than about 10% loss of total mass per day at 200° F. in 15% KCl brine.

15. The downhole tool of claim 1, wherein the degradable substance is a degradable elastomer selected from the group consisting of a polyurethane rubber; a polyester-based polyurethane rubber; a polyether-based polyurethane rubber; a thiol-based polymer; a thiol-epoxy polymer; a hyaluronic acid rubber; a polyhydroxybutyrate rubber; a polyester elastomer; a polyester amide elastomer; a starch-based resin; a polyethylene terephthalate polymer; a polyester thermoplastic; a polylactic acid polymer; a polybutylene succinate polymer; a polyhydroxy alkanoic acid polymer; a polybutylene terephthalate polymer; a polysaccharide; chitin; chitosan; a protein; an aliphatic polyester; poly($\epsilon$-caprolactone); a poly(hydroxybutyrate); poly(ethyleneoxide); poly(phenyllactide); a poly(amino acid); a poly(orthoester); polyphosphazene; a polylactide; a polyglycolide; a poly(anhydride); a polyepichlorohydrin; a copolymer of ethylene oxide/polyepichlorohydrin; a terpolymer of epichlorohydrin/ethylene oxide/allyl glycidyl ether; any copolymer thereof; any terpolymer thereof; and any combination thereof.

16. The downhole tool of claim 1, wherein the degradable substance is a degradable glass material selected from the group consisting of a glass polyalkenoate, borate glass polyalkenoate, calcium phosphate glass, polylactic acid/calcium phosphate glass, phosphate glass, silica glass, and any combination thereof.

17. The downhole tool of claim 1, wherein the minimum production flow area across the wellbore isolation device includes any fluid flow area through the central flow passage and through any other flow paths through or around the wellbore isolation device.

18. The downhole tool of claim 17, wherein the other flow paths comprise at least one flow channel defined longitudinally through the mandrel through which fluids may flow.

19. The downhole tool of claim 1, wherein the inner diameter comprises a diameter of the central flow passage, and the outer diameter comprises a diameter of the wellbore isolation device in an unexpanded configuration.

20. The downhole tool of claim 1, wherein the first flow area across the wellbore isolation device is at least ⅑ of a total flow area of the casing at the location of the wellbore isolation device within the wellbore and the second flow area results from the inner diameter being at least 33% of the outer diameter.

21. A method comprising:
introducing a downhole tool into a wellbore, wherein the downhole tool is a wellbore isolation device that provides a plurality of components including a mandrel, a packer element, and a sealing ball,
wherein the mandrel defines a central flow passage that allows fluid flow in at least one direction through the wellbore isolation device, wherein at least a portion of the mandrel is composed of a slowly degradable metal material having a period for degradation in the range of from about 5 days to about 40 days, at least a portion of the packer element is composed of an elastomer, and at least a portion of the sealing ball is composed of a degradable substance; and wherein the wellbore isolation device provides an inner diameter and an outer diameter, and wherein a minimum production flow area across the wellbore isolation device is selected from the group consisting of:

a first flow area across the wellbore isolation device of at least 1/25 a total flow area of a casing at a location of the wellbore isolation device within a wellbore, a second flow area resulting from the inner diameter being at least 17% of the outer diameter, and any combination thereof;

anchoring the downhole tool within the wellbore at a target location;

performing at least one downhole operation; and degrading the slowly degradable metal material and the degradable substance upon exposure to a wellbore environment.

22. The method of claim 21, wherein the wellbore isolation device is selected from the group consisting of a frac plug, a wellbore packer, a deployable baffle, and any combination thereof.

23. The method of claim 21, wherein the wellbore isolation device is a frac plug and the sealing ball is a frac ball, and wherein the degradable substance is a slowly degradable metal material, rates of degradation of the slowly degradable metal materials of the mandrel and the sealing ball being in the range of from about 0.1% to about 10% loss of total mass per day at 200° F. in 15% KCl brine.

24. The method of claim 21, wherein the elastomer is minimally degradable such that no more than about 50% by volume of the elastomer degrades in the wellbore environment.

25. The method of claim 21, wherein the elastomer is a degradable elastomer that degrades in the presence of the wellbore environment.

26. The method of claim 21, wherein the degradable substance is selected from the group consisting of a degradable metal material, a degradable elastomer, a degradable glass material, and any combination thereof.

27. A system comprising:

a conveyance connected to a service rig and extending through a surface into a wellbore in a subterranean formation; and a downhole tool connected to the conveyance and placed in the wellbore, wherein the downhole tool is a wellbore isolation device that provides a plurality of components including a mandrel, a packer element, and a sealing ball, wherein the mandrel defines a central flow passage that allows fluid flow in at least one direction through the wellbore isolation device, wherein at least a portion of the mandrel is composed of a slowly degradable metal material having a period for degradation in the range of from about 5 days to about 40 days, at least a portion of the packer element is composed of an elastomer, and at least a portion of the sealing ball is composed of a degradable substance, wherein the slowly degradable metal material and the degradable substance degrades upon exposure to a wellbore environment, and wherein the wellbore isolation device provides an inner diameter and an outer diameter, and wherein a minimum production flow area across the wellbore isolation device is selected from the group consisting of:

a first flow area across the wellbore isolation device of at least 1/25 a total flow area of a casing at a location of the wellbore isolation device within a wellbore, a second flow area resulting from the inner diameter being at least 17% of the outer diameter, and any combination thereof.

28. The system of claim 27, wherein the wellbore isolation device is selected from the group consisting of a frac plug, a wellbore packer, a deployable baffle, and any combination thereof.

29. The system of claim 27, wherein the wellbore isolation device is a frac plug and the sealing ball is a frac ball, and wherein the degradable substance is a slowly degradable metal material, rates of degradation of the slowly degradable metal materials of the mandrel and the sealing ball being in the range of from about 0.1% to about 10% loss of total mass per day at 200° F. in 15% KCl brine.

30. The system of claim 27, wherein the elastomer is minimally degradable such that no more than about 50% by volume of the elastomer degrades in the wellbore environment.

31. The system of claim 27, wherein the elastomer is a degradable elastomer that degrades in the presence of the wellbore environment.

32. The system of claim 27, wherein the degradable substance is selected from the group consisting of a degradable metal material, a degradable elastomer, a degradable glass material, and any combination thereof.

* * * * *